United States Patent
Hirose

(10) Patent No.: US 9,967,800 B2
(45) Date of Patent: May 8, 2018

(54) SCHEMES FOR PROVIDING WIRELESS COMMUNICATION

(71) Applicant: Empire Technology Development LLC, Wilmington, DE (US)

(72) Inventor: Haruto Hirose, Yokohama (JP)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 73 days.

(21) Appl. No.: 14/118,315

(22) PCT Filed: May 30, 2013

(86) PCT No.: PCT/US2013/043303
§ 371 (c)(1),
(2) Date: Nov. 18, 2013

(87) PCT Pub. No.: WO2014/193383
PCT Pub. Date: Dec. 4, 2014

(65) Prior Publication Data

US 2015/0131639 A1    May 14, 2015

(51) Int. Cl.
*H04W 48/04* (2009.01)
*H04W 64/00* (2009.01)
*H04W 84/12* (2009.01)
*H04W 48/20* (2009.01)

(52) U.S. Cl.
CPC .......... *H04W 48/04* (2013.01); *H04W 64/00* (2013.01); *H04W 48/20* (2013.01); *H04W 84/12* (2013.01)

(58) Field of Classification Search
None
See application file for complete search history.

(56) References Cited

U.S. PATENT DOCUMENTS 8,077,090 B1 * 12/2011 Chintalapudi ........ G01S 5/0252
  342/450
8,396,023 B2 * 3/2013 Bernett ................ H04B 1/715
  370/252

(Continued)

FOREIGN PATENT DOCUMENTS

| JP | 2001169360 A | 6/2001 |
| JP | 2011258086 A | 12/2011 |
| KR | 101228890 B1 | 2/2013 |
| WO | 2013021596 A1 | 2/2013 |
| WO | 2013070232 A1 | 5/2013 |

OTHER PUBLICATIONS

International Search Report from corresponding International Application No. PCT/US13/43303 dated Aug. 30, 2013.

(Continued)

*Primary Examiner* — Jeffrey M Rutkowski
*Assistant Examiner* — Jonathan B Wood

(57) ABSTRACT

Technologies are generally described for providing wireless communications. In some examples, a method performed under control of a cloud system may include receiving, from an end device, first information including at least one of a location of the end device, a location of an access point to which the end device accesses, a media access control (MAC) address of the end device and a MAC address of the access point; determining that the end device moves to around the location of the access point and returns to around the location of the end device based at least in part on the first information; and instructing the access point to provide a wireless local area network to the end device with suppressed channel hopping.

20 Claims, 9 Drawing Sheets

(56) References Cited

U.S. PATENT DOCUMENTS

| | | | | |
|---|---|---|---|---|
| 8,616,981 B1* | 12/2013 | Guinn | G07F 17/3237 | |
| | | | 463/16 | |
| 8,634,349 B1* | 1/2014 | Shmidt | H04W 4/08 | |
| | | | 370/328 | |
| 9,015,694 B2* | 4/2015 | Gray | G06F 8/665 | |
| | | | 717/170 | |
| 9,097,544 B2* | 8/2015 | Dhanani | G01C 21/34 | |
| 2002/0136226 A1 | 9/2002 | Christoffel et al. | | |
| 2003/0134650 A1* | 7/2003 | Sundar et al. | 455/465 | |
| 2004/0027278 A1* | 2/2004 | Park | G01C 21/165 | |
| | | | 342/357.31 | |
| 2004/0203398 A1* | 10/2004 | Durrant | H04W 16/10 | |
| | | | 455/63.1 | |
| 2005/0136845 A1* | 6/2005 | Masuoka | G01S 5/0294 | |
| | | | 455/67.14 | |
| 2005/0157740 A1* | 7/2005 | Sato | 370/431 | |
| 2006/0025070 A1* | 2/2006 | Kim et al. | 455/3.02 | |
| 2006/0061469 A1* | 3/2006 | Jaeger et al. | 340/539.13 | |
| 2007/0165695 A1* | 7/2007 | Gerhardt | H04B 1/713 | |
| | | | 375/133 | |
| 2007/0165754 A1* | 7/2007 | Kiukkonen | H04B 1/715 | |
| | | | 375/346 | |
| 2008/0255756 A1* | 10/2008 | Friedrichs et al. | 701/201 | |
| 2008/0279204 A1 | 11/2008 | Pratt, Jr. et al. | | |
| 2009/0077620 A1 | 3/2009 | Ravi et al. | | |
| 2009/0247186 A1* | 10/2009 | Ji | G01S 5/02 | |
| | | | 455/456.1 | |
| 2010/0052989 A1* | 3/2010 | Canoy | G01S 1/68 | |
| | | | 342/386 | |
| 2010/0103844 A1 | 4/2010 | Kim | | |
| 2010/0135201 A1* | 6/2010 | Lewis | H04W 12/08 | |
| | | | 370/328 | |
| 2010/0142466 A1* | 6/2010 | Palanki | H04J 11/0053 | |
| | | | 370/329 | |
| 2010/0202428 A1 | 8/2010 | Thompson et al. | | |
| 2010/0332668 A1* | 12/2010 | Shah | H04W 4/02 | |
| | | | 709/229 | |
| 2011/0016120 A1* | 1/2011 | Haughay, Jr. | A63B 24/0062 | |
| | | | 707/734 | |
| 2011/0029370 A1* | 2/2011 | Roeding et al. | 705/14.38 | |
| 2011/0057836 A1* | 3/2011 | Ische | G01S 5/0009 | |
| | | | 342/357.43 | |
| 2011/0201341 A1* | 8/2011 | Choudhury | H04W 72/0426 | |
| | | | 455/450 | |
| 2011/0250871 A1* | 10/2011 | Huang | G06Q 10/06 | |
| | | | 455/412.2 | |
| 2011/0255514 A1* | 10/2011 | Olofsson | H04W 72/0426 | |
| | | | 370/331 | |
| 2011/0319056 A1 | 12/2011 | Toy et al. | | |
| 2012/0014320 A1* | 1/2012 | Nam et al. | 370/328 | |
| 2012/0022944 A1* | 1/2012 | Volpi | G06Q 30/00 | |
| | | | 705/14.53 | |
| 2012/0042036 A1* | 2/2012 | Lau | G06F 8/61 | |
| | | | 709/217 | |
| 2012/0094594 A1* | 4/2012 | Rofougaran et al. | 455/15 | |
| 2012/0110186 A1* | 5/2012 | Kapur | G06F 9/5072 | |
| | | | 709/226 | |
| 2012/0135711 A1 | 5/2012 | Jabara et al. | | |
| 2013/0030873 A1* | 1/2013 | Davidson | G06Q 10/06 | |
| | | | 705/7.36 | |
| 2013/0033381 A1* | 2/2013 | Breed | 340/568.1 | |
| 2013/0102313 A1 | 4/2013 | Tinnakornsrisuphap et al. | | |
| 2013/0103939 A1* | 4/2013 | Radpour | 713/152 | |
| 2013/0110778 A1* | 5/2013 | Taylor | G06F 17/30215 | |
| | | | 707/624 | |
| 2013/0113993 A1* | 5/2013 | Dagit, III | G06F 3/017 | |
| | | | 348/552 | |
| 2013/0136066 A1* | 5/2013 | Kim et al. | 370/329 | |
| 2013/0143597 A1* | 6/2013 | Mitsuya | G01C 21/28 | |
| | | | 455/456.1 | |
| 2013/0150106 A1* | 6/2013 | Bucknell et al. | 455/501 | |
| 2013/0151062 A1* | 6/2013 | Lee et al. | 701/26 | |
| 2013/0155889 A1* | 6/2013 | Brownworth | H04W 36/0083 | |
| | | | 370/252 | |
| 2013/0176952 A1* | 7/2013 | Shin | H04L 5/001 | |
| | | | 370/329 | |
| 2013/0183935 A1* | 7/2013 | Holostov et al. | 455/411 | |
| 2013/0188508 A1* | 7/2013 | Cho | G01S 5/04 | |
| | | | 370/252 | |
| 2013/0201316 A1* | 8/2013 | Binder et al. | 348/77 | |
| 2013/0247117 A1* | 9/2013 | Yamada | G08C 17/02 | |
| | | | 725/93 | |
| 2013/0252629 A1* | 9/2013 | Wigren | G01S 5/0236 | |
| | | | 455/456.1 | |
| 2013/0290096 A1* | 10/2013 | Lizotte, III | G06Q 30/0246 | |
| | | | 705/14.45 | |
| 2013/0336234 A1* | 12/2013 | Ghosh et al. | 370/329 | |
| 2014/0062784 A1* | 3/2014 | Rison | H04B 7/086 | |
| | | | 342/368 | |
| 2014/0071967 A1* | 3/2014 | Velasco | 370/338 | |
| 2014/0073289 A1* | 3/2014 | Velasco | 455/411 | |
| 2014/0080506 A1* | 3/2014 | Siomina | H04W 64/00 | |
| | | | 455/456.1 | |
| 2014/0098671 A1* | 4/2014 | Raleigh et al. | 370/235 | |
| 2014/0105181 A1* | 4/2014 | Milam et al. | 370/332 | |
| 2014/0118159 A1* | 5/2014 | Fish | H04Q 9/00 | |
| | | | 340/870.01 | |
| 2014/0119206 A1* | 5/2014 | Vargantwar | H04W 56/0045 | |
| | | | 370/252 | |
| 2014/0119279 A1* | 5/2014 | Han | H04W 4/00 | |
| | | | 370/328 | |
| 2014/0120955 A1* | 5/2014 | Padden | H04W 36/00 | |
| | | | 455/456.6 | |
| 2014/0146800 A1* | 5/2014 | Hwang | H04W 48/18 | |
| | | | 370/338 | |
| 2014/0173112 A1* | 6/2014 | Seago | H04L 67/32 | |
| | | | 709/226 | |
| 2014/0177487 A1* | 6/2014 | Hammarwall | H04W 72/042 | |
| | | | 370/280 | |
| 2014/0198745 A1* | 7/2014 | Fei | H04W 72/0453 | |
| | | | 370/329 | |
| 2014/0201311 A1* | 7/2014 | Lau | 709/213 | |
| 2014/0223553 A1* | 8/2014 | Gupta | G06F 21/52 | |
| | | | 726/22 | |
| 2014/0236725 A1* | 8/2014 | Golden | G06Q 30/0261 | |
| | | | 705/14.58 | |
| 2014/0241259 A1* | 8/2014 | Wu | H04W 16/14 | |
| | | | 370/329 | |
| 2014/0248907 A1* | 9/2014 | Peroulas | 455/456.1 | |
| 2014/0269526 A1* | 9/2014 | Mitola, III | H04W 72/12 | |
| | | | 370/329 | |
| 2014/0274078 A1* | 9/2014 | Hyde et al. | 455/446 | |
| 2014/0325053 A1* | 10/2014 | Hewitt | H04W 4/023 | |
| | | | 709/224 | |
| 2014/0359001 A1* | 12/2014 | Dupoteau | 709/203 | |
| 2014/0378135 A1* | 12/2014 | Koide | H04W 4/027 | |
| | | | 455/436 | |
| 2015/0046087 A1* | 2/2015 | Nogawa | 701/522 | |
| 2015/0066350 A1* | 3/2015 | Iwata | 701/400 | |
| 2015/0110027 A1* | 4/2015 | Lim et al. | 370/329 | |
| 2015/0133143 A1* | 5/2015 | Huang | H04W 64/006 | |
| | | | 455/456.1 | |
| 2015/0180563 A1* | 6/2015 | Zhang | H04B 7/082 | |
| | | | 370/329 | |
| 2015/0189467 A1* | 7/2015 | Alsehly | G01S 5/0236 | |
| | | | 455/456.1 | |
| 2015/0373491 A1* | 12/2015 | Lim | G01S 5/0257 | |
| | | | 455/456.1 | |

OTHER PUBLICATIONS

Meraki. MS Cloud Managed Switches with Application Visibility.
Open Networks, CloudCommand Technology Overview, https://open.cloudcommand.com/cloudCommand.
Garg, S., et al., "Wireless access server for quality of service and location based access control in 802.11 networks," Proceedings ISCC 2002 Seventh International Symposium on Computers and Communications, 22 pages, (Dec. 17, 2001).

(56) References Cited

OTHER PUBLICATIONS

Supplementary European Search Report from International Application No. 13885479.9 dated Dec. 15, 2016, 81 pages.

* cited by examiner

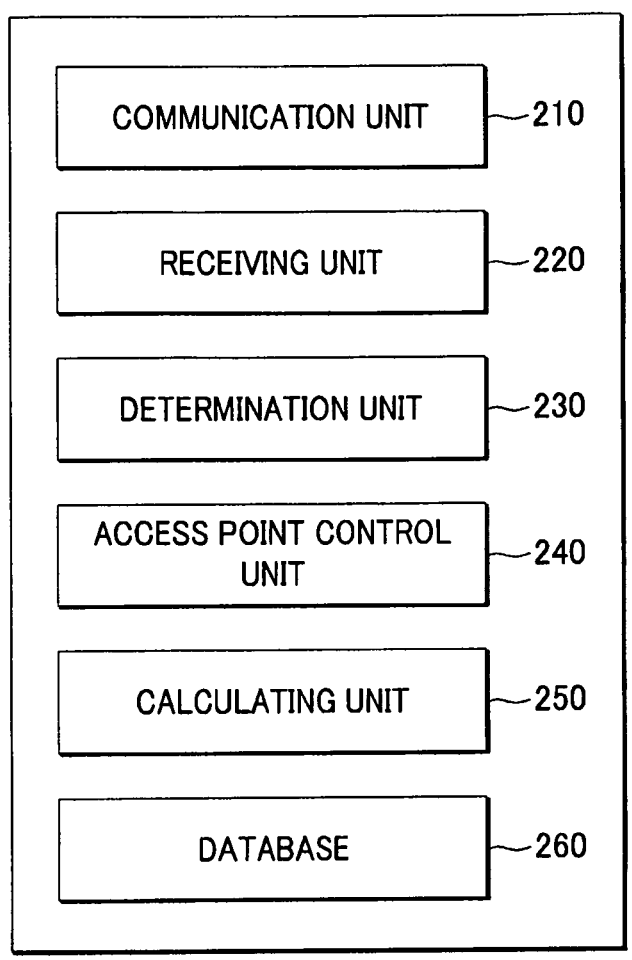

SCHEMES FOR PROVIDING WIRELESS COMMUNICATION

CROSS-REFERENCE TO RELATED APPLICATION

The present application is a U.S. National Stage filing under 35 U.S.C. § 371 of International Application No. PCT/US2013/043303, filed on May 30, 2013. The disclosure of International Application No. PCT/US2013/043303 is incorporated herein by reference in its entirety.

BACKGROUND

It is generally preferable to use wireless local area networks (WLAN), such as a Wi-Fi network, for data transmission because the wireless local area networks (WLAN) are typically available at lower cost but with higher throughput than mobile networks. Recently, as portable devices which are able to use the wireless local area networks (WLAN) increase, efforts for improving quality and usability of the wireless local area networks (WLAN) have drawn intense scrutiny.

SUMMARY

In an example, a method performed under control of a cloud system may include: receiving, from an end device, a first information including at least one of a location of the end device, a location of an access point to which the end device accesses, a media access control (MAC) address of the end device and a MAC address of the access point; determining that the end device moves to around the location of the access point and returns to around the location of the end device based at least in part on the first information; and instructing the access point to provide a wireless local area network to the end device with a suppressed channel hopping.

In another example, a cloud system may include: a communication unit configured to connect to an end device; a receiving unit configured to receive, from the end device, a first information including at least one of a location of the end device, a location of an access point to which the end device accesses, a media access control (MAC) address of the end device and a MAC address of the access point; a determination unit configured to determine that the end device moves to around the location of the access point and returns to around the location of the end device based at least in part on the first information; and an access point control unit configured to instruct the access point to provide a wireless local area network to the end device with a suppressed channel hopping.

In yet another example, a method performed under control of an end device may include: connecting to a cloud system; transmitting, to the cloud system, an information including at least one of a location of the end device, a location of an access point to which the end device accesses, a media access control (MAC) address of the end device and a MAC address of the access point; determining that the end device moves to around the location of the access point and returns to around the location of the end device; notifying the cloud system that the end device moves to around the location of the access point and returns to around the location of the end device; and connecting to a wireless local area network provided by the access point with a suppressed channel hopping.

In yet another example, an end device may include: a connecting unit configured to connect to a cloud system; a transmitting unit configured to transmit, to the cloud system, an information including at least one of a location of the end device, a location of an access point to which the end device accesses, a media access control (MAC) address of the end device and a MAC address of the access point; a determination unit configured to determine that the end device moves to around the location of the access point and returns to around the location of the end device; and a notification unit configured to notify the cloud system that the end device moves to around the location of the access point and returns to around the location of the end device. The connecting unit may connect to a wireless local area network provided by the access point with a suppressed channel hopping after the notification by the notification unit.

In yet another example, a computer-readable storage medium may store thereon computer-executable instructions that, in response to execution, cause a cloud system to perform operations including receiving, from an end device, a first information including at least one of a location of the end device, a location of an access point to which the end device accesses, a media access control (MAC) address of the end device and a MAC address of the access point; determining whether the end device moves to around the location of the access point and returns to around the location of the end device based at least in part on the first information; and instructing the access point to provide a wireless local area network to the end device with a suppressed channel hopping.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

FIG. 2 shows a schematic block diagram illustrating an example architecture for a cloud system, arranged in accordance with at least some embodiments described herein;

DETAILED DESCRIPTION

Figure 1A:
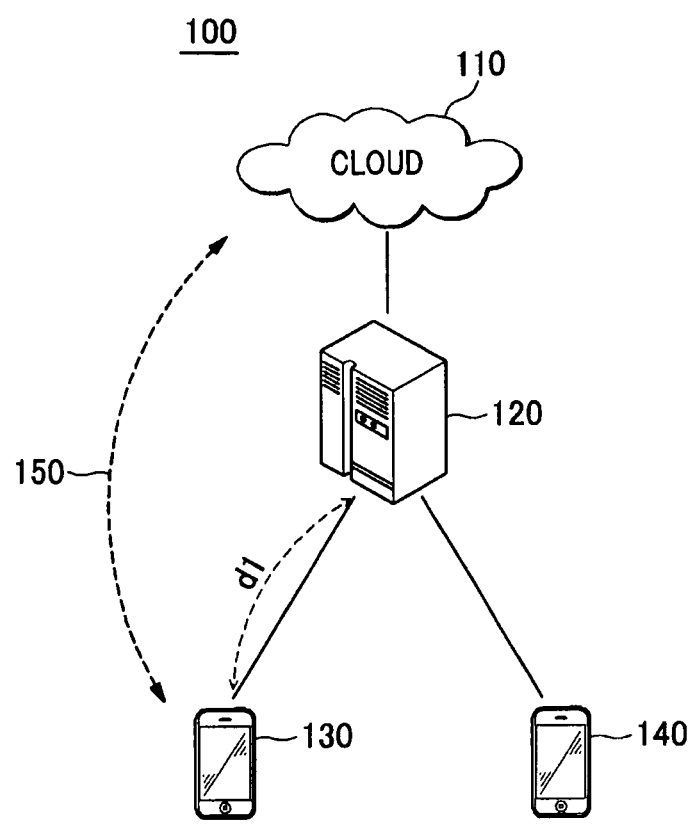
FIGS. 1A to 1C schematically show an illustrative example of a network communication environment including a cloud system, an access point, a first end device and a second end device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to schemes for providing wireless communications. Technologies are generally described for controlling an access point to provide a wireless local area network such as a Wi-Fi network to an end device with a suppressed channel hopping.

In general, in a certain area, as end devices that intend to use a wireless local area network such as a Wi-Fi network provided by an access point increase, a density of the end devices connected to the access point may become excessive. Then, even though an end device detects and catches the access point, it fails to provide a stable wireless local area network to the end device due to a channel hopping. In some examples, an end device may connect to a cloud system and register information including a location of the end device, a location of the access point around the end device, and unique identifiers of the end device and the access point such as a media access control (MAC) address of the end device and a MAC address of the access point. The end device may move to around the location of the access point which the end device wants to connect to and returns back to around the original location of the end device. Then, the end device may notify the cloud system that the end device moves to around the location of the access point and returns back to around the original location of the end device.

Upon receiving the notification of the end device, the cloud system may send, to the access point, parameters including such as a priority order of the end device for a certain network channel, a network intensity, and so forth. Then, the access point may provide a wireless local area network to the end device based on the parameters sent from the cloud system. Accordingly, the end device may be connected to the wireless local area network with a certain priority during a certain period, so the channel hopping may be suppressed.

Figure 1B:
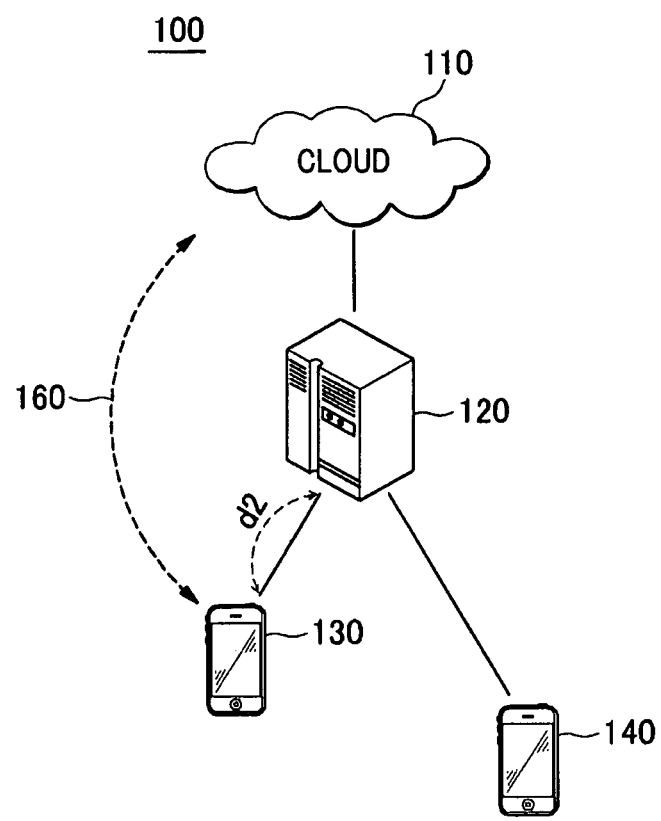
Figure 1C:
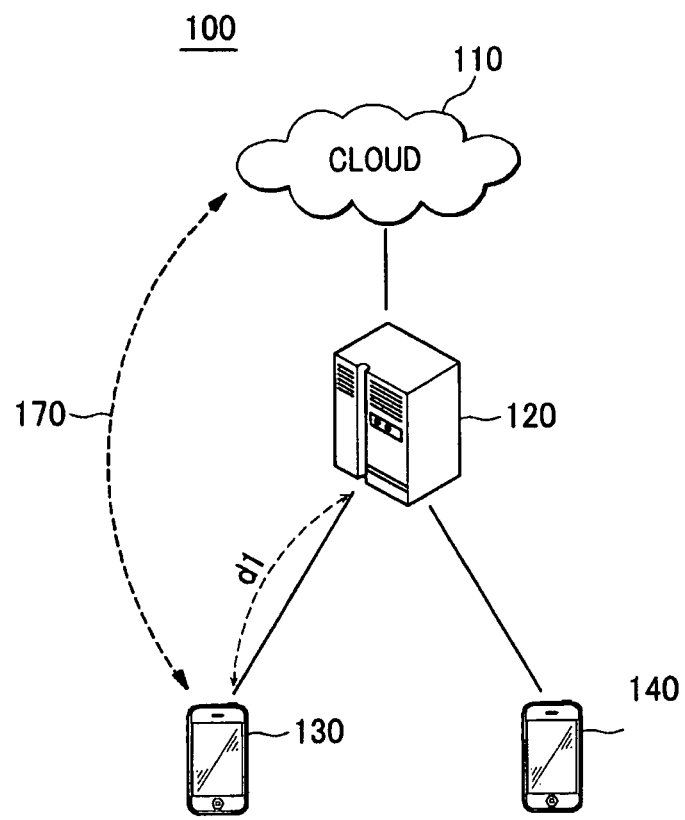

FIGS. 1A to 1C schematically show an illustrative example of a network communication environment 100 including a cloud system 110, an access point 120, a first end device 130 and a second end device 140, arranged in accordance with at least some embodiments described herein. By way of example, but not limited to, access point 120 may include a Wi-Fi access point provided and/or controlled by a mobile operating server that provides a Wi-Fi network, a mobile telecommunications network including a 3rd generation (3G) mobile telecommunications network, a 4th generation (4G) mobile telecommunications network, and any other mobile telecommunications networks.

Further, by way of example, but not limited to, first end device 130 and second end device 140 may respectively include any type of a mobile device, a portable device or a personal communication terminal which is enable to use and control a wireless network such as a Wi-Fi network.

As illustrated in FIG. 1A, access point 120 may connect to cloud system 110. Cloud system 110 may register and manage information regarding the connected access point 120. In some embodiments, first end device 130 and second end device 140 may connect to access point 120 while first end device 130 is separated from access point 120 with a distance $d_1$. Access point 120 may provide a wireless local area network to first end device 130 and second end device 140. The wireless local area network provided by access point 120 may include a Wi-Fi network. In the example illustrated in FIG. 1A, it may be assumed that one access point 120 is connected to cloud system 110 and two end devices 130 and 140 are connected to access point 120. However, one skilled in the art will appreciate that any number of access points can be connected to cloud system 110 and any number of end devices can be connected to access point 120.

In some embodiments, first end device 130 may access to and connect to cloud system 110 via a network (as illustrated by a dashed line 150 in FIG. 1A). First end device 130 may transmit, to cloud system 110, first information regarding access point 120 and first end device 130. By way of example, but not limited to, the first information may include at least one of a location of first end device 130, a location of access point 120, route information between access point 120 and first end device 130, a media access control (MAC) address of first end device 130 and a MAC address of access point 120. Non-limiting examples of the route information may include a distance between access point 120 and first end device 130, obstacles existing in the vicinity of access point 120 and first end device 130, direction from first end device 130 to access point 120 or moving speed of first end device 130. By way of example, but not limited to, first end device 130 may obtain the route information by using at least one of a global positioning system (GPS), an antenna, a camera, a mic or an accelerometer communicatively coupled to first end device 130. By way of example, but not limited to, first end device 130 may obtain the location information by using any one of well-known location information obtaining schemes using a global positioning system (GPS), a third generation (3G) and/or fourth generation (4G) mobile telecommunication network system. Cloud system 110 may receive the transmitted first information and identify access point 120, first end device 130 and the location of access point 120 and first end device 130.

Further, in some embodiments, cloud system 110 may calculate second information regarding first end device 130 and access point 120 based on the first information. By way of example, but not limited to, the second information may include at least one of a precise present location of first end device 130, a precise present location of access point 120 or a route between access point 120 and first end device 130. So, cloud system 110 may update the location information of access point 120 and first end device 130.

Further, cloud system 110 may store and register at least one of the first information transmitted from first end device 130 and the second information calculated on cloud system 110 in a database of cloud system 110. In some embodiments, cloud system 110 may store at least one of the first information and the second information in an application, and transmit the application to first end device 130. The application may be downloaded by first end device 130 and installed on first end device 130.

In some embodiments, first end device 130 may check a network condition of first end device 130. For example, first end device 130 may estimate and evaluate a channel congestion level of a wireless local area network provided by access point 120. If the estimated channel congestion level is larger than a predetermined value, first end device 130 may determine that a problem such as an excessive channel hopping occurs on first end device 130.

For being provided a stable wireless local area network with suppressed channel hopping, as illustrated in FIG. 1B, first end device 130 may move to around the location of access point 120. In some embodiments, first end device 130 may move close to access point 120 with a distance $d_2$ which is shorter than the distance $d_1$. Then, first end device 130 may transmit, to cloud system 110, a first notification indicating that first end device 130 moves to around the location of access point 120 (as illustrated by a dashed line 160 in FIG. 1B). By way of example, but not limited to, first end device 130 may transmit the first notification to cloud system 110 by issuing a beacon. Further, first end device 130 may transmit, to cloud system 110, the first information including the location of first end device 130 close to access point 120, the location of access point 120 and the route information between access point 120 and first end device 130.

In some embodiments, cloud system 110 may receive the first notification from first end device 130. Upon receiving the first notification, cloud system 110 may recognize and determine that first end device 130 moves to around the location of access point 120. In some embodiments, cloud system 110 may calculate the distance $d_2$ between access point 120 and first end device 130 based on the transmitted first information including the location of access point 120 and first end device 130. Then, cloud system 110 may determine that first end device 130 moves to around the location of access point 120 based on the calculated result.

Further, as illustrated in FIG. 1C, first end device 130 may return to around the original location of first end device 130. In some embodiments, first end device 130 may return back to the original location which is separated from the location of access point 120 with the distance $d_1$. Then, first end device 130 may transmit, to cloud system 110, a second notification indicating that first end device 130 returns to around the original location of first end device 130 (as illustrated by a dashed line 170 in FIG. 1C). By way of example, but not limited to, first end device 130 may transmit the second notification to cloud system 110 by issuing a beacon. Further, first end device 130 may transmit, to cloud system 110, the first information including the location of first end device 130 and access point 120.

In some embodiments, cloud system 110 may receive the second notification from first end device 130. Upon receiving the second notification, cloud system 110 may recognize and determine that first end device 130 returns to around the original location of access point 120 based on the registered route information including such as a distance between access point 120 and first end device 130, obstacles existing in the vicinity of access point 120 and first end device 130, direction from first end device 130 to access point 120 or moving speed of first end device 130, etc. In some embodiments, cloud system 110 may calculate the distance $d_1$ between access point 120 and first end device 130 based on the transmitted the first information including the location of access point 120 and first end device 130. Then, cloud system 110 may determine that first end device 130 returns to around the original location of access point 120 based on the calculated result.

Upon determining that first end device 130 moves to around the location of access point 120 and returns to around the original location of first end device 130, cloud system 110 may instruct access point 120 to provide a wireless local area network such as a Wi-Fi network to first end device 130 with suppressed channel hopping based on the route information including such as a distance between access point 120 and first end device 130, obstacles existing in the vicinity of access point 120 and first end device 130, direction from first end device 130 to access point 120 or moving speed of first end device 130, etc. In some embodiments, cloud system 110 may provide access point 120 with parameters including at least one of a priority order of first end device 130 for a certain network channel and an intensity of the wireless local area network. Then, access point 120 may provide the wireless local area network to first end device 130 based on the provided parameters. For example, but not limited to, access point 120 may allocate a certain range of network channel to first end device 130 based on the priority order, so access point 120 may suppress the channel hopping. Accordingly, first end device 130 may be connected to the wireless local area network with a certain priority during a certain period with suppressed channel hopping.

Although it is described that the wireless local area network is provided to first end device 130 with suppressed channel hopping, one skilled in the art will appreciate that the same process between cloud system 110, access point 120 and first end device 130 may be executed between cloud system 110, access point 120 and second end device 140, so the wireless local area network may be provided to second end device 140 with suppressed channel hopping.

FIG. 2 shows a schematic block diagram illustrating an example architecture for cloud system 110, arranged in accordance with at least some embodiments described herein. As depicted in FIG. 2, cloud system 110 may include a communication unit 210, a receiving unit 220, a determination unit 230, an access point control unit 240, a calculating unit 250, and a database 260. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of communication unit 210, receiving unit 220, determination unit 230, access point control unit 240, calculating unit 250, and database 260 may be included in an instance of an application hosted on cloud system 110.

Communication unit 210 may be configured to connect to an end device. Further, communication unit 210 may be configured to connect to access point 120 which provides a wireless local area network. Access point 120 may include a Wi-Fi access point and the wireless local area network provided by access point 120 may include a Wi-Fi network.

Further, communication unit 210 may be configured to provide the end device with an application storing first information and second information. By way of example, but not limited to, the first information may include at least one of a location of the end device, a location of access point 120 to which the end device accesses, a media access control (MAC) address of the end device and a MAC address of access point 120. Further, the second information may be calculated based on the first information. By way of example, but not limited to, the second information may include at least one of a calculated present location of the end device, a calculated present location of access point 120 and a route from the end device to access point 120.

Receiving unit 220 may be configured to receive the first information from the end device. In some embodiments, receiving unit 220 may receive the first information from the end device periodically. By way of example, but not limited to, the end device may obtain the location information of the end device and access point 120 by using any one of well-known location information obtaining schemes using a global positioning system (GPS), a third generation (3G) and/or fourth generation (4G) mobile telecommunication network system and then transmit the obtained location information to receiving unit 220 as the first information.

Further, receiving unit 220 may be configured to receive, from the end device, a notification indicating that the end device moves to around the location of access point 120 and returns to around the location of the end device. By way of example, but not limited to, receiving unit 220 may receive a beacon which includes the notification.

Determination unit 230 may be configured to determine that the end device moves to around the location of access point 120 and returns to around the location of the end device based, at least in part, on the first information received by receiving unit 220. In some embodiments, if the end device moves close to access point 120, the end device may transmit the location information of the end device to receiving unit 220. Further, if the end device returns back to the original location of the end device, the end device may transmit the location information of the end device to receiving unit 220. Based on the received location information, determination unit 230 may determine that the end device moves to around the location of access point 120 and returns to around the location of the end device. In some embodiments, determination unit 230 may determine that the end device moves to around the location of access point 120 and returns to around the location of the end device, if receiving unit 220 receives the notification indicating that the end device moves to around the location of access point 120 and returns to around the location of the end device.

Access point control unit 240 may be configured to instruct access point 120 to provide the wireless local area network to the end device with suppressed channel hopping. In some embodiments, if determination unit 230 determines that the end device moves to around the location of access point 120 and returns to around the location of the end device, access point control unit 240 may provide access point 120 with parameters including at least one of a priority order of the end device for a certain network channel and an intensity of the wireless local area network. Then, access point 120 may provide the wireless local area network to the end device based on the provided parameters. For example, but not limited to, access point 120 may allocate a certain range of network channel to the end device based on the priority order, so access point 120 may suppress the channel hopping.

Calculating unit 250 may be configured to calculate the second information including at least one of a present location of the end device, a present location of access point 120 and the route between the end device and access point 120 based on the first information.

Database 260 may be configured to store at least one of the first information and the second information.

Figure 3:
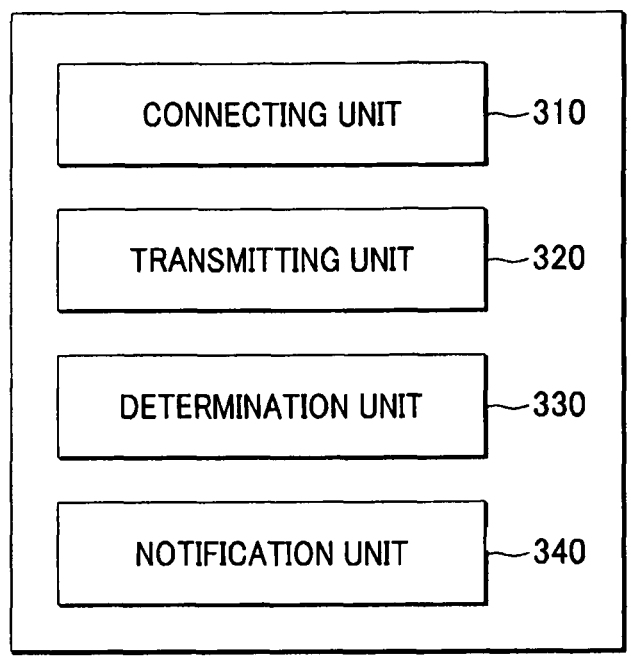
FIG. 3 shows a schematic block diagram illustrating an example architecture for a first end device, arranged in accordance with at least some embodiments described herein.

FIG. 3 shows a schematic block diagram illustrating an example architecture for first end device 130, arranged in accordance with at least some embodiments described herein. As depicted in FIG. 3, first end device 130 may include a connecting unit 310, a transmitting unit 320, a determination unit 330, and a notification unit 340. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of connecting unit 310, transmitting unit 320, determination unit 330, and notification unit 340 may be included in an instance of an application hosted on first end device 130.

Connecting unit 310 may be configured to connect to cloud system 110 via a network. Further, connecting unit 310 may be configured to connect to access point 120 and be provided a wireless local area network such as a Wi-Fi network from access point 120.

Transmitting unit 320 may be configured to transmit, to cloud system 110, information including at least one of a location of first end device 130, a location of access point 120, a media access control (MAC) address of first end device 130 and a MAC address of access point 120. In some embodiments, transmitting unit 320 may transmit the information to cloud system 110 periodically.

Determination unit 330 may be configured to determine that first end device 130 moves to around the location of access point 120 and returns to around the location of first end device 130. In some embodiments, if first end device 130 moves close to access point 120, first end device 130 may determine that first end device 130 moves to around the location of access point 120. Further, if first end device 130 returns back to the original location of first end device 130, first end device 130 may determine that first end device 130 returns to around the original location of first end device 130.

Notification unit 340 may be configured to notify cloud system 110 that first end device 130 moves to around the location of access point 120 and returns to around the original location of first end device 130. In some embodiments, notification unit 340 may transmit, to cloud system 110, a notification indicating that first end device 130 moves to around the location of access point 120 and returns to around the original location of first end device 130 by issuing a beacon.

If notification unit 340 transmit, to cloud system 110, the notification indicating that first end device 130 moves to around the location of access point 120 and returns to around the original location of first end device 130, cloud system 110 may instruct access point 120 to provide a wireless local area network to first end device 130 with suppressed channel hopping. Then, connecting unit 310 may be configured to connect to the wireless local area network provided by access point 120 with suppressed channel hopping.

Figure 4:
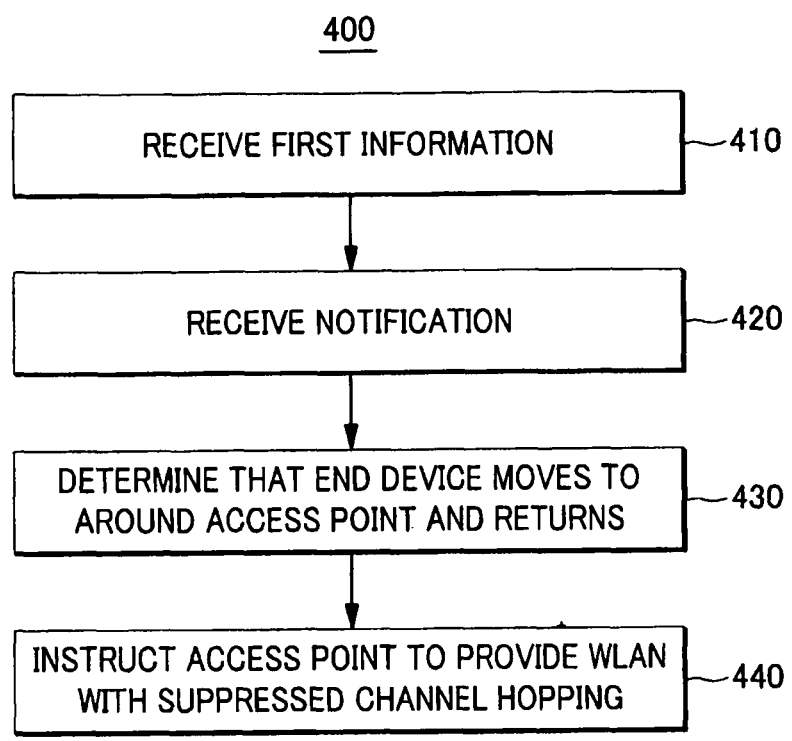
FIG. 4 shows an example flow diagram of a process of a cloud system for controlling an access point to provide a wireless local area network with suppressed channel hopping, arranged in accordance with at least some embodiments described herein.

FIG. 4 shows an example flow diagram of a process 400 of cloud system 110 for controlling access point 120 to provide a wireless local area network with suppressed channel hopping, arranged in accordance with at least some embodiments described herein. The method in FIG. 4 may be implemented in communication environments 100 including cloud system 110, access point 120, first end device 130 and second end device 140, as illustrated in FIGS. 1A to 1C. An example process may include one or more operations, actions, or functions as illustrated by one or more blocks 410, 420, 430 and/or 440. Although illustrated as discrete blocks, various blocks may be divided into additional blocks, combined into fewer blocks, or eliminated, depending on the desired implementation. Processing may begin at block 410.

At block 410 (Receive First Information), cloud system 110 may receive first information from an end device. In some embodiments, cloud system 110 may receive first information from first end device 130. The first information may include at least one of a location of first end device 130, a location of access point 120, a media access control (MAC) address of first end device 130 and a MAC address of access point 120. In some embodiments, cloud system 110 may receive the first information from first end device 130 periodically. Processing may proceed from block 410 to block 420.

At block 420 (Receive Notification), cloud system 110 may receive, from the end device, a notification indicating that the end device moves to around the location of access point 120 and returns to around the location of the end device. In some embodiments, when first end device 130 moves close to access point 120 and returns back to the original location of first end device 130, first end device 130 may transmit a notification indicating that first end device 130 moves to around the location of access point 120 and returns to around the location of first end device 130. Processing may proceed from block 420 to block 430.

At block 430 (Determine that End device Moves to around Access Point and Returns), cloud system 110 may determine that the end device moves to around the location of access point 120 and returns to around the location of the end device based on the first information received at block 410. In some embodiments, when first end device 130 moves close to access point 120, first end device 130 may transmit the first information including the location of first end device 130 close to access point 120 and the location of access point 120. Then, cloud system 110 may determine that first end device 130 moves to around the location of access point 120 based on the received first information. Further, when first end device 130 returns back to the original location of first end device 130, first end device 130 may transmit the first information including the original location of first end device 130 and the location of access point 120. Then, cloud system 110 may determine that first end device 130 returns to around the location of first end device 130 based on the received first information. Processing may proceed from block 430 to block 440.

At block 440 (Instruct Access Point to Provide a WLAN with Suppressed Channel Hopping), cloud system 110 may instruct access point 120 to provide a wireless local area network to the end device with a suppressed channel hopping. In some embodiments, if, at block 430, cloud system 110 determines that first end device 130 moves to around the location of access point 120 and returns to around the original location of first end device 130, cloud system 110 may instruct access point 120 to provide a wireless local area network to first end device 130 with suppressed channel hopping. By way of example, but not limited to, cloud system 110 may provide access point 120 with parameters including at least one of a priority order of first end device 130 for a certain network channel and an intensity of the wireless local area network. Then, access point 120 may provide the wireless local area network to first end device 130 based on the provided parameters. For example, but not limited to, access point 120 may allocate a certain range of network channel to first end device 130 based on the priority order for the network channel, so access point 120 may suppress the channel hopping. Accordingly, first end device 130 may be connected to the wireless local area network with a certain priority during a certain period with suppressed channel hopping.

Figure 5:
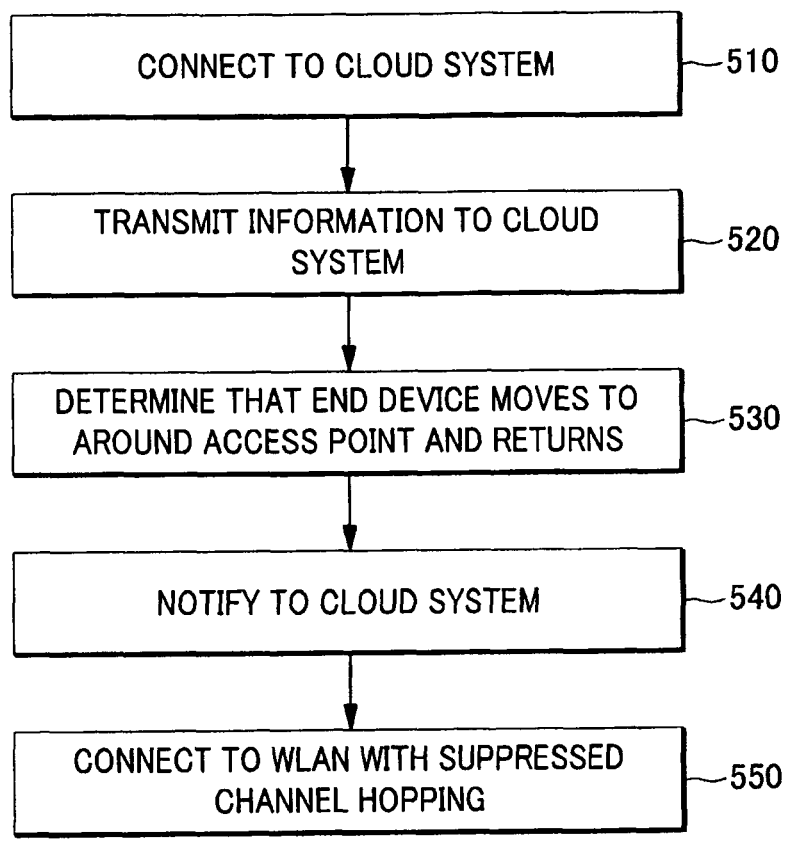
FIG. 5 shows an example flow diagram of a process of a first end device for connecting to a wireless local area network with suppressed channel hopping, arranged in accordance with at least some embodiments described herein.

FIG. 5 shows an example flow diagram of a process 500 of first end device 130 for connecting to a wireless local area network with suppressed channel hopping, arranged in accordance with at least some embodiments described herein. The method in FIG. 5 may be implemented in communication environments 100 including cloud system 110, access point 120, first end device 130 and second end device 140, as illustrated in FIGS. 1A to 1C. An example process may include one or more operations, actions, or functions as illustrated by one or more blocks 510, 520, 530, 540 and/or 550. Although illustrated as discrete blocks, various blocks may be divided into additional blocks, combined into fewer blocks, or eliminated, depending on the desired implementation. Processing may begin at block 510.

At block 510 (Connect to Cloud System), first end device 130 may connect to cloud system 110 via a network. Processing may proceed from block 510 to block 520.

At block 520 (Transmit Information to Cloud System), first end device 130 may transmit, to cloud system 110, information including at least one of a location of first end device 130, a location of access point 120 to which first end device 130 accesses, a media access control (MAC) address of first end device 130 and a MAC address of access point 120. In some embodiments, first end device 130 may transmit the information to cloud system 110 periodically. Processing may proceed from block 520 to block 530.

At block 530 (Determine that End device Moves to around Access Point and Returns), first end device 130 may determine that first end device 130 moves to around the location of access point 120 and returns to around the location of first end device 130. In some embodiments, if first end device 130 moves close to access point 120, first end device 130 may determine that first end device 130 moves to around the location of access point 120. Further, if first end device 130 returns back to the original location of first end device 130, first end device 130 may determine that first end device 130 returns to around the original location of first end device 130. Processing may proceed from block 530 to block 540.

At block 540 (Notify to Cloud System), first end device 130 may notify cloud system 110 that first end device 130 moves to around the location of access point 120 and returns to around the original location of first end device 130. In some embodiments, first end device 130 may transmit, to cloud system 110, a notification indicating that first end device 130 moves to around the location of access point 120 and returns to around the original location of first end device 130 by issuing a beacon. Processing may proceed from block 540 to block 550.

At block 550 (Connect to a WLAN with Suppressed Channel Hopping), first end device 130 may connect to a wireless local area network with suppressed channel hopping. In some embodiments, after first end device 130 transmitted the notification to cloud system 110 and cloud system 110 received the notification at block 540, cloud system 110 may instruct access point 120 to provide a wireless local area network to first end device 130 with suppressed channel hopping. Then, first end device may connect to the wireless local area network provided by access point 120 with suppressed channel hopping.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
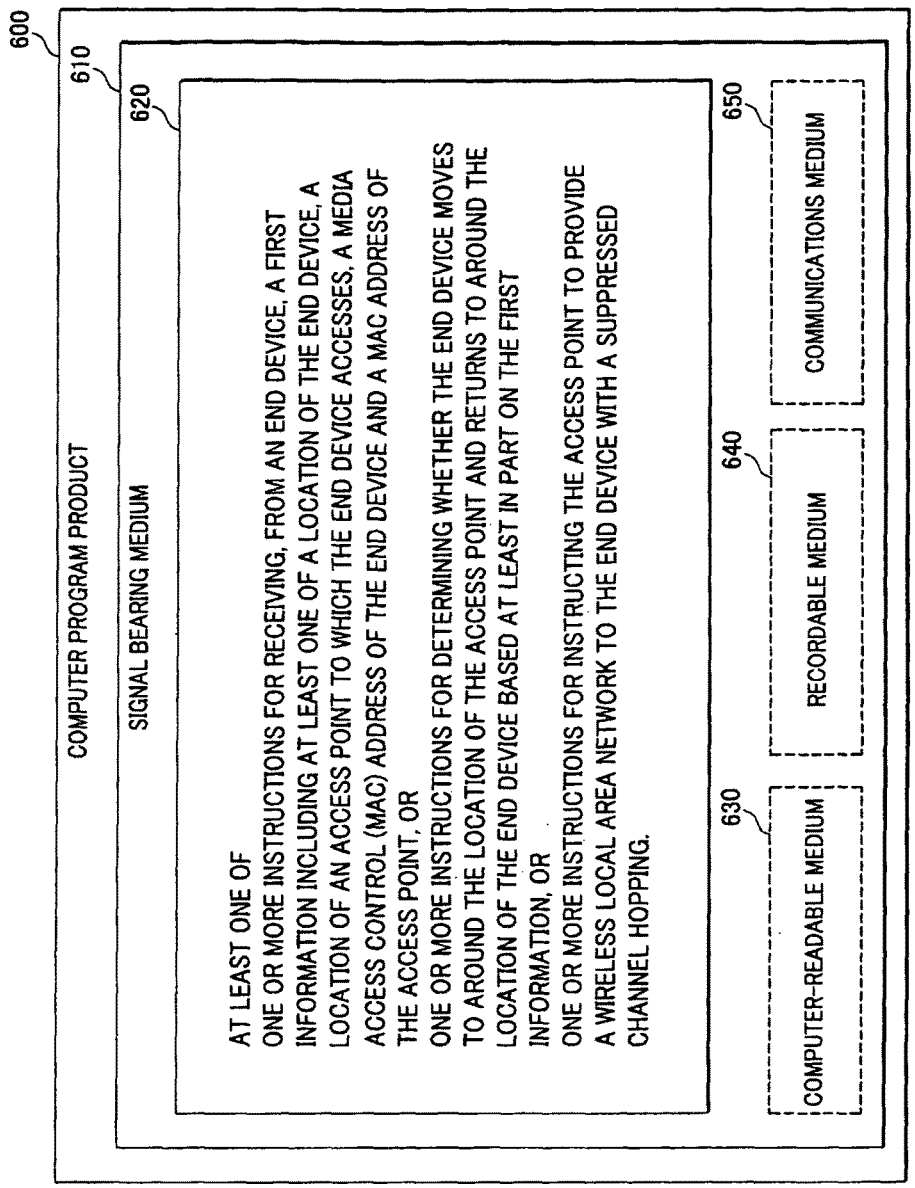
FIG. 6 illustrates computer program products that may be utilized to provide a scheme for providing wireless communications, arranged in accordance with at least some embodiments described herein.

FIG. 6 illustrates computer program products that may be utilized to provide a scheme for providing wireless communications, arranged in accordance with at least some embodiments described herein. Program product 600 may include a signal bearing medium 610. Signal bearing medium 610 may include one or more instructions 620 that, when executed by, for example, a processor, may provide the functionality described above with respect to FIGS. 1A-5. By way of example, but not limitation, instructions 620 may include: one or more instructions for receiving, from an end device, a first information including at least one of a location of the end device, a location of an access point to which the end device accesses, a media access control (MAC) address of the end device and a MAC address of the access point; one or more instructions for determining whether the end device moves to around the location of the access point and returns to around the location of the end device based at least in part on the first information; one or more instructions for instructing the access point to provide a wireless local area network to the end device with a suppressed channel hopping. Thus, for example, referring to FIG. 4, cloud system 110 may undertake one or more of the blocks shown in FIG. 4 in response to instructions 620.

In some implementations, signal bearing medium 610 may encompass a computer-readable medium 630, such as, but not limited to, a hard disk drive, a CD, a DVD, a digital tape, memory, etc. In some implementations, signal bearing medium 610 may encompass a recordable medium 640, such as, but not limited to, memory, read/write (R/W) CDs, R/W DVDs, etc. In some implementations, signal bearing medium 610 may encompass a communications medium 650, such as, but not limited to, a digital and/or an analog communication medium (e.g., a fiber optic cable, a waveguide, a wired communications link, a wireless communication link, etc.). Thus, for example, program product 600 may be conveyed to one or more modules of cloud system 110 by an RF signal bearing medium 610, where the signal bearing medium 610 is conveyed by a wireless communications medium 650 (e.g., a wireless communications medium conforming with the IEEE 802.11 standard).

Figure 7:
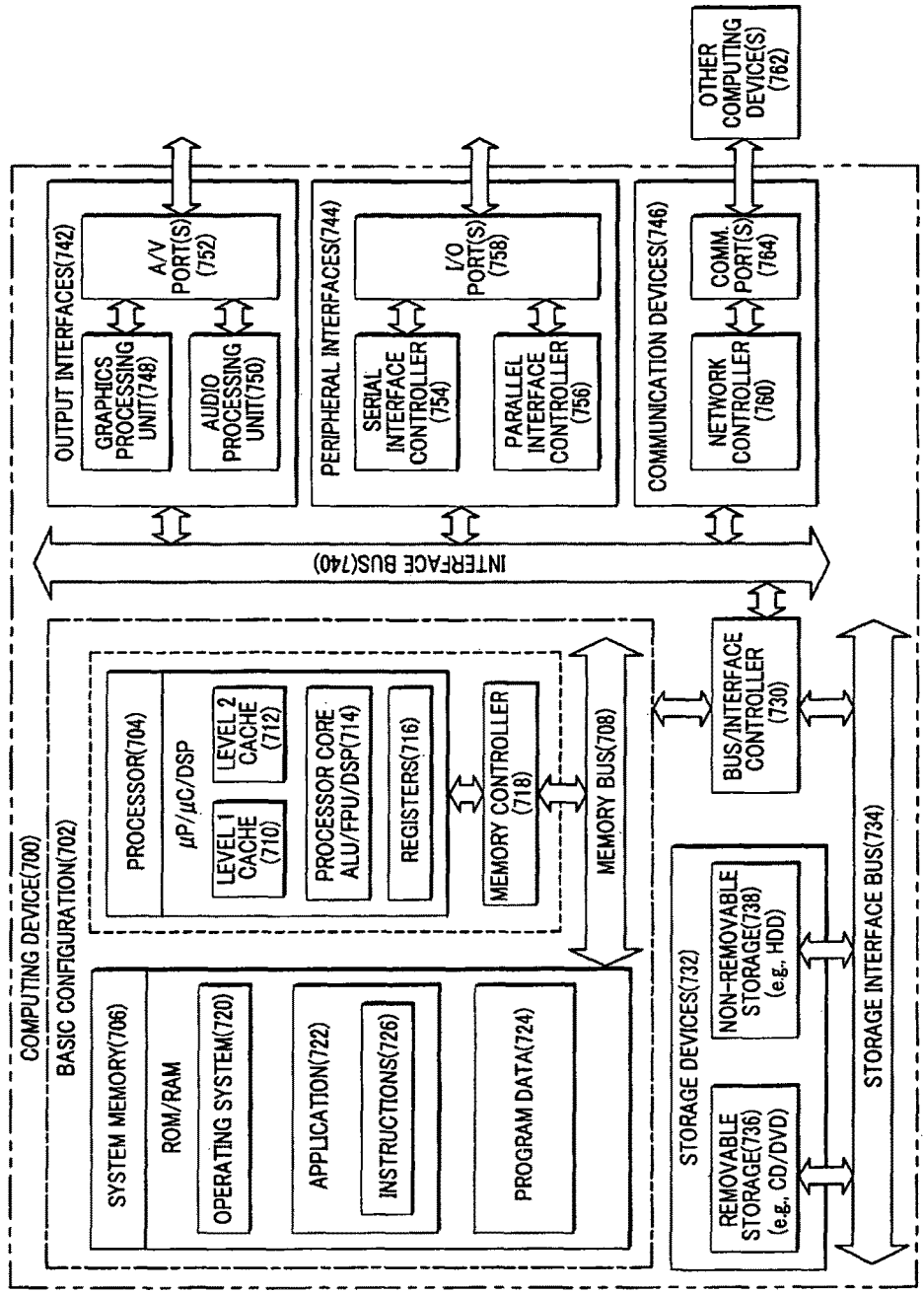
FIG. 7 is a block diagram illustrating an example computing device that may be utilized to provide a scheme for providing wireless communications, arranged in accordance with at least some embodiments described herein.

FIG. 7 is a block diagram illustrating an example computing device that may be utilized to provide a scheme for providing wireless communications, arranged in accordance with at least some embodiments described herein. In these examples, elements of computing device 700 may be arranged or configured for a device. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, an application 722, and program data 724. Application 722 may include instructions 726 that may be arranged to perform the functions as described herein including the actions described with respect to cloud system architecture as shown in FIG. 2 or including the actions described with respect to the flow charts shown in FIG. 2. In some examples, application 722 may be arranged to operate with program data 724 on an operating system 720 such that the schemes for providing wireless communications as described herein may be provided.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a cloud system, comprising:
   receiving, from an end device, first information that includes a first location of the end device and a location of an access point that the end device accesses;
   determining based at least on the first information, that the end device moves to a second location that is closer than the first location to the location of the access point;
   determining that the end device moves to a third location that is farther than the second location from the location of the access point;
   providing, to the access point, a parameter that includes a priority order of the end device for a network channel of a wireless local area network; and
   in response to the determinations that the end device moves to the second location that is closer than the first location to the location of the access point and that the end device moves to the third location that is farther than the second location from the location of the access point, instructing the access point to allocate a range of the network channel with a suppressed channel hopping to the end device, wherein the allocation is based on the priority order of the end device for the network channel of the wireless local area network.

2. The method of claim 1, wherein the receiving the first information includes receiving, from the end device, a notification that indicates that the end device moves to the second location.

3. The method of claim 2, wherein the notification is transmitted to the cloud system by a beacon.

4. The method of claim 1, wherein the access point suppresses the channel hopping based at least in part on the parameter that includes the priority order of the end device for the network channel.

5. The method of claim 1, further comprising:
   calculating, based at least in part on the first information, second information that includes at least one of:
   a present location of the end device,
   a present location of the access point, and
   a route from the end device to the access point.

6. The method of claim 5, further comprising: storing at least one of the first information and the second information in a database of the cloud system.

7. The method of claim 5, further comprising: providing, to the end device, an application that stores at least one of the first information and the second information.

8. The method of claim 1, wherein:
   the access point includes a Wi-Fi access point, and
   the wireless local area network includes a Wi-Fi network.

9. The method of claim 1, wherein:
   the determination that the end device moves to the second location is based at least in part on a first direction of travel of the end device from the first location to the second location, and
   the determination that the end device moves to the third location is further based at least in part on a second direction of travel of the end device from the second location to the third location.

10. A cloud system, comprising:
    a receiver configured to receive, from an end device, first information that includes a first location of the end device and a location of an access point that the end device accesses;
    a determination unit configured to:
    determine based at least on the first information, that the end device moves to a second location that is closer than the first location to the location of the access point;
    determining that the end device moves to a third location that is farther than the second location from the location of the access point; and
    an access point control unit configured to:
    provide, to the access point, a parameter that includes a priority order of the end device for a network channel of a wireless local area network; and
    in response to the determinations that the end device moves to the second location that is closer than the first location to the location of the access point and that the end device moves to the third location that is farther than the second location from the location of the access point, instruct the access point to allocate a range of the network channel with a suppressed channel hopping to the end device, wherein the allocation is based on the priority order of the end device for the network channel of the wireless local area network.

11. The cloud system of claim 10, wherein the first information received by the receiver includes a notification that indicates that the end device moves to the second location.

12. The cloud system of claim 11, wherein the receiver is configured to receive a beacon that includes the notification.

13. The cloud system of claim 10, wherein the determination unit is configured to facilitate suppression of the channel hopping by providing the parameter that includes the priority order of the end device for the network channel.

14. The cloud system of claim 10, further comprising:
    a calculation unit configured to calculate, based at least in part on the first information, second information that includes at least one of:
    a present location of the end device,
    a present location of the access point, and
    a route from the end device to the access point.

15. The cloud system of claim 14, further comprising: a database configured to store at least one of the first information and the second information.

16. The cloud system of claim 14, further comprising a communication unit configured to provide, to the end device, an application that stores at least one of the first information and the second information.

17. The cloud system of claim 10, wherein:
    the access point includes a Wi-Fi access point, and
    the wireless local area network includes a Wi-Fi network.

18. A non-transitory computer-readable storage medium having stored thereon computer-executable instructions that, in response to execution, cause a cloud system to perform or control performance of operations to:
    identify information, received from an end device, that includes a first location of the end device and a location of an access point that the end device accesses;

determine, based at least on the first information, that the end device moves to a second location that is closer than the first location to the location of the access point;

determine, that the end device moves to a third location that is farther than the second location from the location of the access point;

provide, to the access point, a parameter that includes a priority order of the end device for a network channel of a wireless local area network; and in response to the determinations that the end device moves to the second location that is closer than the first location to the location of the access point and that the end device moves to the third location that is farther than the second location from the location of the access point, instruct the access point to allocate a range of the network channel with a suppressed channel hopping to the end device, wherein the allocation is based on the priority order of the end device for the network channel of the wireless local area network.

19. A method performed under control of an end device, the method comprising:

communicatively connecting to a cloud system;

transmitting, to the cloud system, information that includes a first location of the end device, and a location of an access point that the end device accesses;

determining based at least on the first information, that the end device moves to a second location that is closer than the first location to the location of the access point;

determining that the end device moves to a third location that is farther than the second location from the location of the access point;

notifying the cloud system that the end device moves to the second location and then to the third location; and communicatively connecting to a range of a network channel with a suppressed channel hopping, wherein the range of the network channel is provided by the access point in response to the notification, and wherein the range of the network channel is provided by the access point based on a priority order of the end device for the network channel.

20. An end device comprising:

a connection unit configured to communicatively connect to a cloud system;

a transmitter configured to transmit, to the cloud system, information that includes a first location of the end device, and a location of an access point that the end device accesses;

a determination unit configured to:

determining based at least on the first information, that the end device moves to a second location that is closer than the first location to the location of the access point; and determining that the end device moves to a third location that is farther than the second location from the location of the access point; and a notification unit configured to notify the cloud system that the end device moves to the second location and then to the third location, wherein the connection unit is further configured to communicatively connect to a range of a network channel with a suppressed channel hopping provided by the access point in response to the notification by the notification unit, and wherein the range of the network channel is provided by the access point based on a priority order of the end device for the network channel.

* * * * *